United States Patent
Aktas et al.

(10) Patent No.: US 10,827,465 B2
(45) Date of Patent: Nov. 3, 2020

(54) ALLOCATING RADIO RESOURCES FOR ONE OR MORE RADIO DEVICES IN A INDUSTRIAL APPLICATION

(71) Applicant: Telefonaktiebolaget LM Ericsson (publ), Stockholm (SE)

(72) Inventors: Ismet Aktas, Aachen (DE); Junaid Ansari, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 60 days.

(21) Appl. No.: 15/541,929

(22) PCT Filed: Mar. 27, 2017

(86) PCT No.: PCT/EP2017/057231
§ 371 (c)(1),
(2) Date: Jul. 6, 2017

(87) PCT Pub. No.: WO2018/177505
PCT Pub. Date: Oct. 4, 2018

(65) Prior Publication Data
US 2018/0279260 A1 Sep. 27, 2018

(51) Int. Cl.
*H04W 4/00* (2018.01)
*H04W 72/04* (2009.01)
(Continued)

(52) U.S. Cl.
CPC ........... *H04W 72/04* (2013.01); *H04W 28/16* (2013.01); *H04W 36/0072* (2013.01);
(Continued)

(58) Field of Classification Search
USPC ........ 370/329, 252, 328, 338, 278, 332, 522
See application file for complete search history.

(56) References Cited

U.S. PATENT DOCUMENTS

2009/0163223 A1* 6/2009 Casey ................... H04W 36/22
455/453
2016/0302113 A1* 10/2016 Hwang ............. H04W 36/0072

FOREIGN PATENT DOCUMENTS

EP          2911442 A1    8/2015

OTHER PUBLICATIONS

Nokia, "Introduction of Rel-14 NB-IoT enhancements into idle mode", 3GPP TSG-RAN2 Meeting #97, Feb. 13-17, 2017, pp. 1-38, Athens, Greece, R2-1701654.

* cited by examiner

*Primary Examiner* — Phuongchau Ba Nguyen
(74) *Attorney, Agent, or Firm* — Patent Portfolio Builders, PLLC

(57) ABSTRACT

A communication network for an industrial application of allocating radio resources for one or more radio devices is provided. A global resource coordinator in the communication network allocates first radio resources to a first local resource coordinator in a first cell of the communication network. The first radio resources are used by at least one non-stationary radio device in the first cell, making some of the first radio resources allocated to a non-stationary radio device in the first cell exclusively available for the non-stationary radio device in one or more second cells next to the first cell. The global resource coordinator divides radio resources allocated to the non-stationary radio device in time slots in the time domain in a disjunctive manner into a first portion for the non-stationary radio device and a second portion.

18 Claims, 13 Drawing Sheets

(51) Int. Cl.
*H04W 74/08* (2009.01)
*H04W 28/16* (2009.01)
*H04W 36/00* (2009.01)
*H04W 72/08* (2009.01)

(52) U.S. Cl.
CPC ...... *H04W 74/0816* (2013.01); *H04W 72/082* (2013.01); *H04W 74/0808* (2013.01)

ALLOCATING RADIO RESOURCES FOR ONE OR MORE RADIO DEVICES IN A INDUSTRIAL APPLICATION

TECHNICAL FIELD

The present disclosure relates to allocating radio resource for one or more radio devices in an industrial application, a method of radio communication in an industrial application, a radio control node, and a radio device. Furthermore, the present disclosure relates to corresponding computer programs.

BACKGROUND

One key objective of 5G is the support of ultra-low latency and reliable machine-type communication, i.e., Critical-MTC or Ultra Reliable Low Latency Communication (URLLC), which needs to address the low latency and high reliability requirements of industrial applications. One of the key limiting conditions is the system capacity, which is dependent upon the available spectrum bandwidth. With an increasing number of field devices such as sensors and actuators (e.g., robots) in a factory and their varying traffic needs (e.g., packet sizes inter arrival time of packets, priority, realtime requirements, etc.), deploying only a single base station (BS) is impractical due to capacity limitations, i.e., with a certain spectrum bandwidth a specific number of devices can be supported. In other words, dedicated radio resources assigned to a certain number of field devices could become a bottleneck in order to meet their latency and reliability requirements. An intuitive solution to meet the capacity requirements is to deploy multiple smaller cells managed by local base stations. This design approach requires appropriate coordination mechanisms among the local base stations in order to carry out a deployment covering large factory halls. Evidently, without coordination and radio resource management, an arbitrary use of the wireless spectrum in multiple cells leads to inter-cell interference and degradation in QoS. Especially in industrial use-cases where field devices can be mobile such as in automated guided vehicles, mobile robots and mobile working platforms (e.g., car factory), an efficient mobility support scheme (particularly focusing on latency and reliability) for the entire factory hall and, thus, among different radio cells is a necessity. In a nutshell, in URLLC (cf. C-MTC) systems mobility has to be supported such that low-latency and high reliability demands are satisfied.

Radio resources such as power regulations and user allocations in time and frequency have to be coordinated across a whole factory, e.g. by way of one or more radio control unit (s), to achieve the desired coverage and connectivity for each device within a factory hall. Especially, in order to prevent interference and to ensure that the QoS (Quality of Service) requirements for the automation processes are satisfied. For this purpose, a two-tier coordination hierarchy for radio resource coordination can be utilized: In the first tier, a single Global Radio Coordinator (GRC) governs coarse grained coordination of radio resources and mobility on a broader operational area, a set of Local Radio Coordinators (LRCs) carries out fine-grained coordination of radio resources for field devices in its radio cell. FIG. 1 provides an illustration of the is envisioned architecture. The two-tier coordination hierarchy logically separates mission-critical functionalities from generic functionalities. These functionalities are described in the following.

In the first tier, the GRC acts as enforcing or advisory coordinator and is responsible for generic functionalities such as authentication, admission control, global resource management, interference coordination among different cells in the licensed spectrum or coexistence management in the unlicensed spectrum. The GRC covers a larger operational area, e.g., the complete factory hall, and handles functionalities on longer time scales (i.e., more than 1 ms). Moreover, having global knowledge about all devices a GRC can decide about when a device should initiate a handover and to which target LRC, i.e., GRC can take the central coordination decisions. Please note that LRCs (and/or alternatively individual devices) could contribute to the information triggering coordination decisions at the GRC.

In the second tier, the LRCs operate in a smaller area called local cell. A local cell can cover one or more automation processes and contains several devices, e.g., Programmable Logic Controllers (PLCs), sensors, and actuators.

SUMMARY

The LRCs may manage radio resources of their associated devices on a more granular time-scale (ca. 1 ms and lower). The LRC is the entity responsible for carrying out the time-critical and reliable communication. The rationale behind an LRC covering an entire time-critical automation application and its field devices is to minimize additional communication hops and, thus, keeping the processing and communication latency low. A single LRC can coordinate multiple time-critical automation applications provided that the overall communication requirements such as range, traffic QoS and capacity are satisfied. In contrast, the GRC may coordinate several LRCs by managing resources among different local cells on a higher level in order to coordinate and minimize the is interference between local cells.

Traditional systems have been designed to support handover for mobile broadband (MBB) traffic which has fairly different requirements compared to URLLC applications. Existing mechanisms, for instance in LTE, target mobile broadband and voice traffic, whereas the requirements for URLLC traffic is much different and therefore warrants new mechanisms to support mobility while satisfying the sheer constraints on low-latency and high reliability.

Current mobility support schemes have very long handover or interruption times, which make them less suitable for wireless industrial automation applications requiring low latency communication. For example, automated guided vehicles (AGVs) have the following requirements:

| E2e latency | Reliability | Data size | Communication range between devices | No. of devices per factory hall | Machine mobility (indoors) |
|---|---|---|---|---|---|
| 10 to 50 ms | $1\text{-}10^{-6}$ to $1\text{-}10^{-9}$ | <300 bytes | ~2 m | <1000 | <10 m/s |

An example of a mobile, i.e. non-stationary, (radio) device, may be an AGV, with requirements as shown in the table above, which mainly originate from safety regulations.

A non-stationary radio device, such as an AGV can drive across the whole factory hall. If for communication a multi cell deployment is used, a handover between the cells is necessary.

In LTE a handover time requires at least 50 ms, which makes it unsuitable for the use-case of a non-stationary radio device, such as an AGV. There are different variants for a handover in LTE. All of them have in common that a random access channel (RACH) and some signaling messages have to be exchanged before the actual data can be transmitted. During the access attempt on the RACH, collision can occur. However, a preassigned preamble can help to still identify the original sender. There exist 64 different preambles which increases the chance of identifying the sender in case of a collision. Thus, in particular in case of more than 64 devices compete, a is collision can happen. In case of a collision the next random access phase is used, which further increases the delay for a handover. The hand over procedure as available in LTE is unable to satisfy the latency requirements for the mobile wireless industrial automation applications such as AGV and mobile robots. A faster handover procedure is needed.

According to a first aspect, a method of allocating radio resources for one or more radio devices in an industrial application is provided, the method comprising: allocating radio resources to at least one non-stationary radio device such that radio resources allocated to the non-stationary device in a first cell are exclusively available for the non-stationary device in at least one second cell next to, preferably adjacent to, the first cell.

According to a second aspect, a radio control node for allocating radio resources for one or more radio devices in a cellular industrial application is provided, the node comprising: a module for allocating radio resources to at least one non-stationary radio device such that radio resources allocated to the non-stationary device in a first cell are exclusively available for the non-stationary device in at least one second cell next to, preferably adjacent to, the first cell.

According to a third aspect, a computer program product, comprising program code for performing the steps of the method according to the first aspect is provided, when the computer program product is executed on one or more computing devices, such as a radio control node.

According to a fourth aspect, a method of radio communication in an industrial application is provided, the method comprising: at least one non-stationary radio device performing radio communication via radio resources allocated to the non-stationary device in a first cell and in at least one second cell next to, preferably adjacent to, the first cell.

According to a fifth aspect, a non-stationary radio device for an industrial application is provided, the non-stationary radio device being operative to perform radio communication via radio resources allocated to the non-stationary radio device in a first cell and in at least one second cell next to, preferably adjacent to, the first cell, the radio resources being exclusively available for the non-stationary radio device.

According to a sixth aspect, a computer program product, comprising program code for performing the steps of the fourth aspect is provided, when the computer program product is executed on one or more computing devices, such as a radio device.

Of course, the present disclosure is not limited to the above features and advantages. Indeed, additional features and advantages are presented in the following detailed description, and in the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be described in detail below, aspects of the present disclosure may be implemented entirely as hardware units, entirely as software modules (including firmware, resident software, micro-code, etc.), or as a combination of software units and hardware modules. For example, embodiments of the present disclosure may take the form of a non-transitory computer readable medium storing software instructions in the form of a computer program that, when executed on a programmable device, configures the programmable device to execute the various methods described below.

Figure 1:
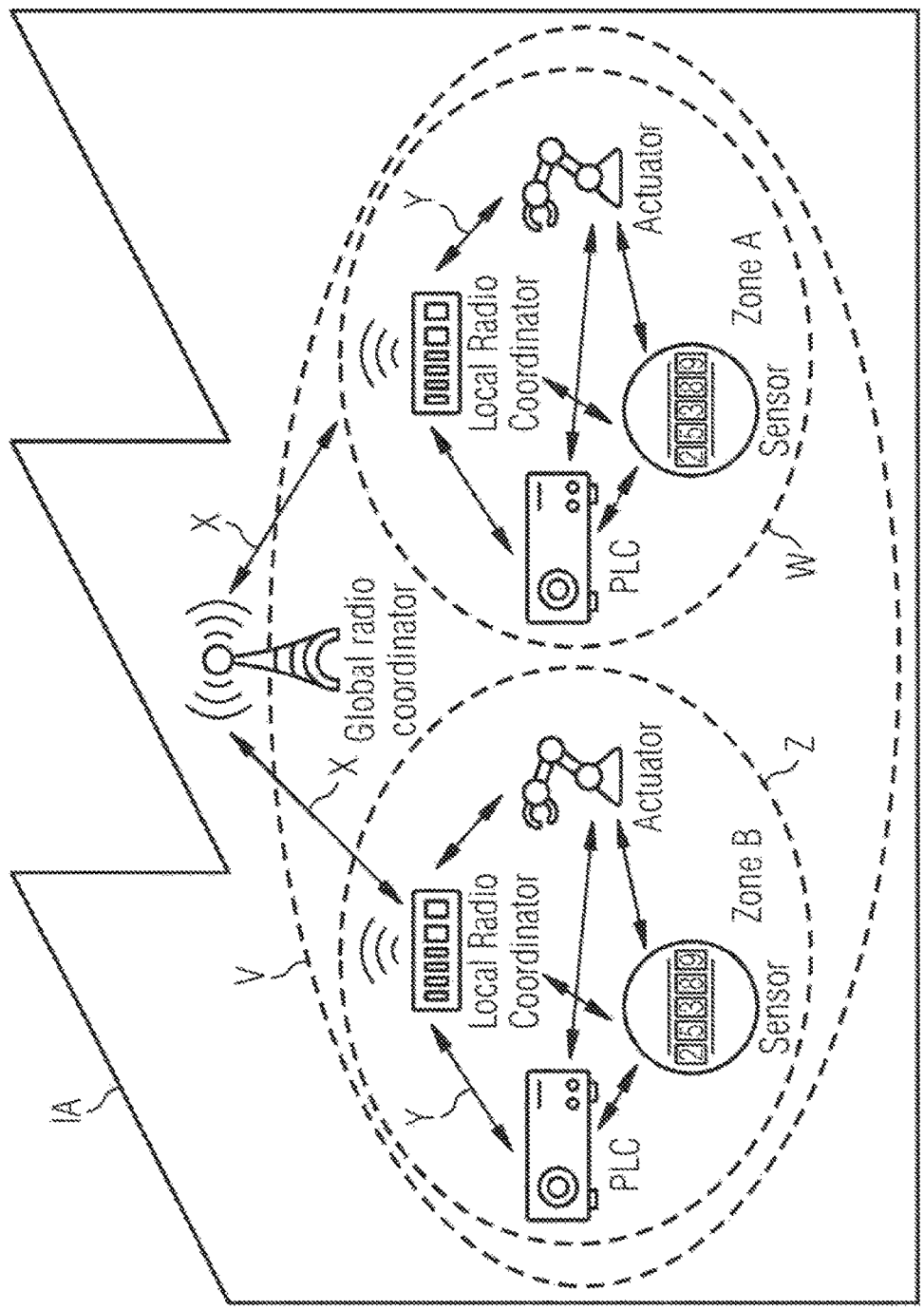
FIG. 1 is a schematic representation of a two-tier coordination hierarchy for a multi-cellular wireless communication in an industrial process.

FIG. 1 is a schematic representation of a two-tier coordination hierarchy for wireless communication in an industrial application IA.

In the first tier, a global radio coordinator, GRC, acts as radio resource coordinator with a global view on the entire factory hall and is responsible for generic functionalities such as authentication, admission control, global resource management, interference coordination among different cells in the licensed spectrum and/or coexistence management in the unlicensed spectrum. In this case operation within the licensed shared spectrum is possible as well. For example, the GRC can reside in the digital unit of the eNodeB in LTE. The GRC covers a larger operational area and handles functionalities on longer time scales (e.g., more than 1 ms). Moreover, having global knowledge about all process devices (capable of wireless communication) in an industrial application, a GRC can decide about the rebalancing of resources when the load within a cell, Z, W, coordinated by a local radio coordinator, LRC, arises. One or more, or even all, LRCs (and/or alternatively individual (process) devices) could contribute to the information triggering the balancing and thus reassignment of resources (and thus access spectrum) between different LRCs.

In the second tier, the one or more LRCs operate in a smaller area called local cell, Z, W. A local cell can cover one or more automation processes and contains several process devices, e.g., Programmable Logic Controllers (PLCs), sensors, and/or actuators. The LRCs manage radio resources of their associated process devices on a more granular time-scale (ca. 1 ms and lower). The LRC is the entity responsible for carrying out the time-critical and reliable communication (at the process device level). This operation can be performed in cooperation with the GRC as well. The rationale behind an LRC covering an entire time-critical automation application and its process devices is to minimize additional communication hops and, thus, keeping the processing and communication latency low. The LRC can also allow for Device-to-Device (D2D) communication between radio devices, i.e., network assisted D2D. A single LRC can coordinate multiple time-critical automation applications provided that the overall communication requirements such as range, traffic QoS and capacity are satisfied. In contrast, the GRC coordinates several LRCs by managing resources among different local cells on a higher level in order to coordinate and minimize the interference between local cells. Physically, a certain LRC can run on the same physical device as a the GRC, e.g., a digital unit of the eNodeB. Alternatively, a LRC can also run on completely different devices such as a radio base station (RBS). The LRC can also be collocated at a process device in an automation cell or may located at a separate entity.

Thus it is to be understood that a radio control node can be implemented by way of one or more LRCs and/or a GRC. Furthermore, it is to be understood that a radio device may be process device, e.g. an actuator, a sensor or a PLC, capable of radio communication.

The system, comprising at least one LRC and a GRC, may have a bootstrap phase and an operational phase. In the bootstrap phase all devices including static and mobile process devices may join the network by exchanging some messages with the LRC. In this phase information for administration and/or management of the industrial application, in particular with respect to the wireless communication in the industrial application, can be exchanged between the radio devices, one or more LRCs and a GRC. Subsequently, according to the required needs of the one or more process devices (such as traffic types etc.), the GRC may assign resources to the LRC. Thus a signaling scheme with a licensed shared access (LSA) database is proposed to request (or release) additional spectrum, in cases when the requested resources are not sufficient (or to release the additional spectrum in cases of overprovisioning). Furthermore, devices might have different traffic characteristics, i.e., data sizes, inter arrival rates, priority levels, delay and reliability needs. The traffic characteristics or traffic types may be time varying. As such, the traffic characteristics can be non-homogeneous at different process devices or in different cells. One or more LRCs may obtain resources depending on the number of the process devices and their traffic requirements. Moreover, a classification scheme to map these different characteristics to traffic types is proposed and also a mapping scheme to certain spectrum types based on their traffic requirements. In the operational phase, the quality of service requirements need to be guaranteed. Moreover, the traffic characteristics and network topologies do not remain the same during the course of operation and instead can be variable. This variability needs to be incorporated appropriately.

Within an industrial application IA it may furthermore be distinguished between static (stationary) and mobile (non-stationary) applications. Static applications are for example sensors, robots, and programmable logic controllers (PLCs). Mobile applications could be, as described above, automated guided vehicles, mobile robots, and mobile platforms. However, also sensors, robots, and programmable logic controllers (PLCs) may be non-stationary. A mobile application can consist of a single sensor or an actuator, or it can consist of multiple sensors, actuators, and a PLC. Thus it may be differentiated between static (stationary) and mobile (non-stationary) devices.

Alternatively, or additionally, within an industrial application IA it may be distinguished between (i) high priority traffic, such as periodic and sporadic time-critical data, and (ii) low priority traffic, such as best effort traffic. LRCs may consequently obtain radio resources depending on the number of devices and/or their traffic requirements. In order to guarantee the quality of service requirements needs, e.g. in the operational phase. Moreover, the traffic characteristics and network topologies may not remain the same during the course of operation and instead can be variable. These variability needs to be incorporated appropriately. Which type of information can be exchanged between LRC and GRC will be explained later within this disclosure.

Figure 2:
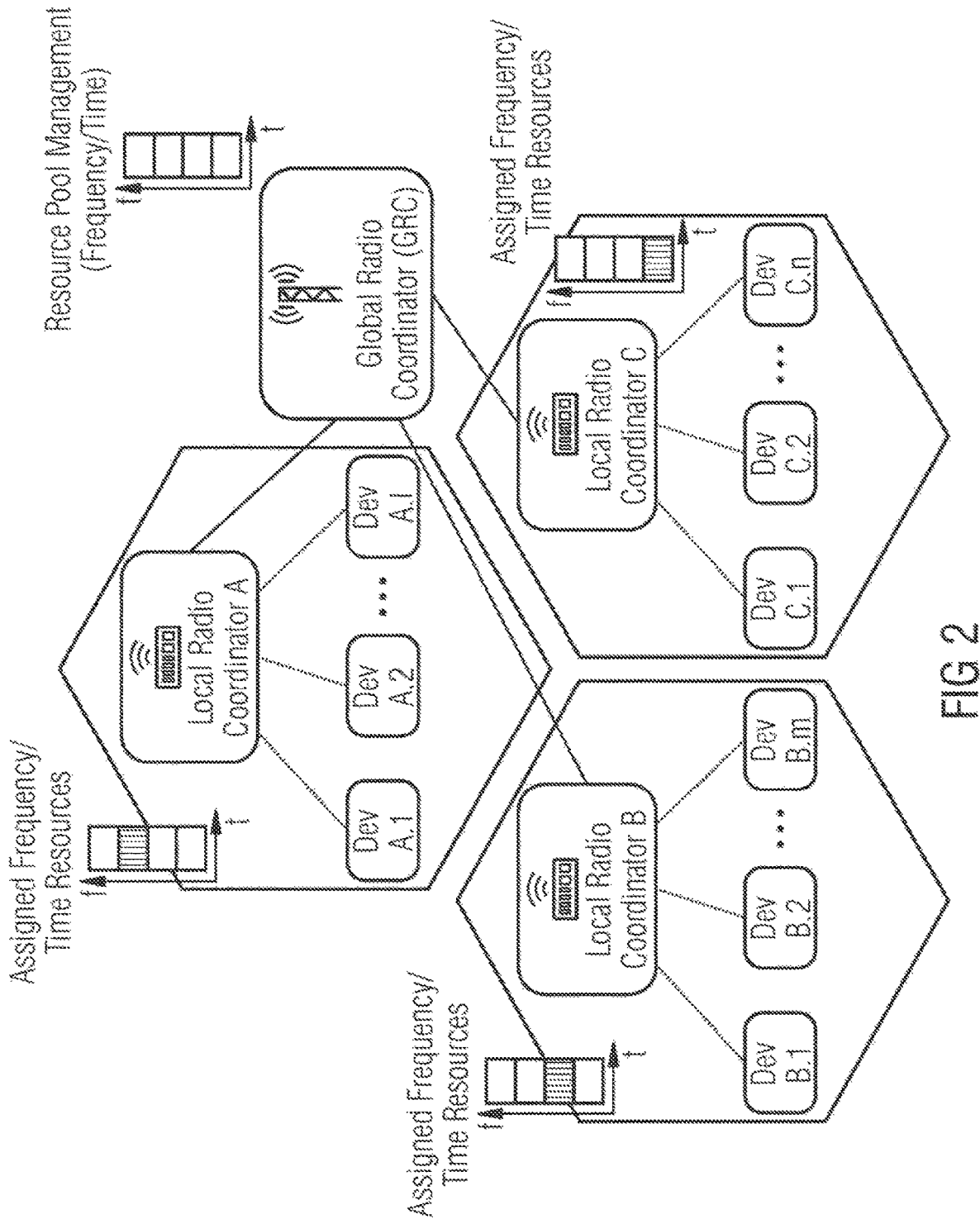
FIG. 2 is another schematic representation of a two-tier coordination hierarchy for a multi-cellular wireless communication in an industrial process.

FIG. 2 depicts another schematic representation of a two-tier coordination hierarchy for a multi-cellular radio communication in an industrial application IA and provides an overview on a potential multi-cell deployment, such as e.g. in a factory hall. The radio devices within a local cell are coordinated by an LRC. The underlying multiplexing methodology may be an FDMA and/or slotted TDMA-based scheme. In other words, the resources as shown in FIG. 2 are subdivided in sub-bands in the frequency domain and into time slots in the time domain. All LRCs A, B, C may be time synchronized and coordinated by a GRC. During operation a respective LRC A, B, C may regularly inform the GRC about its current resource requirements either as a set of parameters (which combines results in the resource requirements) or as a pre-calculated single parameter. In either of the cases, the resource requirement calculations may be based on one or more of the following parameters: (1) the number of active devices, (2) traffic load of one or more devices, (3) signal quality metric (for instance, minimum, maximum, average or another statistics over a time window of one or more devices; and per device and per location), (4) subjected interference (minimum, maximum, and average over a time window of one or more devices; and possibly device location) (5) resource utilization inside its local cell, and (6) traffic class of one or more coordinated applications within the LRC. These metrics are necessary for the GRC to make adequate radio resource management decisions for all LRCs such that inter-cell interference is minimized. Furthermore, the GRC may coordinate the handover procedure of mobile devices between the LRCs. In turn, the GRC provides the LRCs with following parameters: (1) available radio resources in frequency, (2) available radio resources in time, (3) maximum transmission power, and (4) location specific configurations (i.e., different transmission power regulations between two devices) and spectrum regulation specific configuration (i.e., different transmission power regulations based on the used spectrum) and combinations thereof.

Based on the number of devices and device requirements, the GRC may assign radio resources to one or more of the LRCs. The assigned resources among different (neighboring) LRCs are preferably not intersecting either in frequency and/or in time at a given location. However, the frequency resources can again be reused by one or more far away LRCs, e.g. an LRC located at least one cell apart or in other words, non-neighboring LRCs or cells. The distance will be elaborated later in more detail. Thus, radio resources may be assigned such that interference is minimized across the entire factory hall.

One or more of the following rules may govern the system behavior in an industrial application, such as a factory hall: (1) After resources are assigned by the LRC to its devices, devices with high priority traffic may directly access the medium by using their (exclusively) assigned radio resources, (2) in case of available low priority traffic, neighboring cells can use (shared) radio resources in the listen-before-talk principle to access the medium. Thus, high priority traffic is not affected by low priority traffic since low priority traffic will never access the medium in case of a busy medium. Allowing low priority traffic to use the medium in a LBT-principle allows a more efficient use of the medium.

Figure 3:
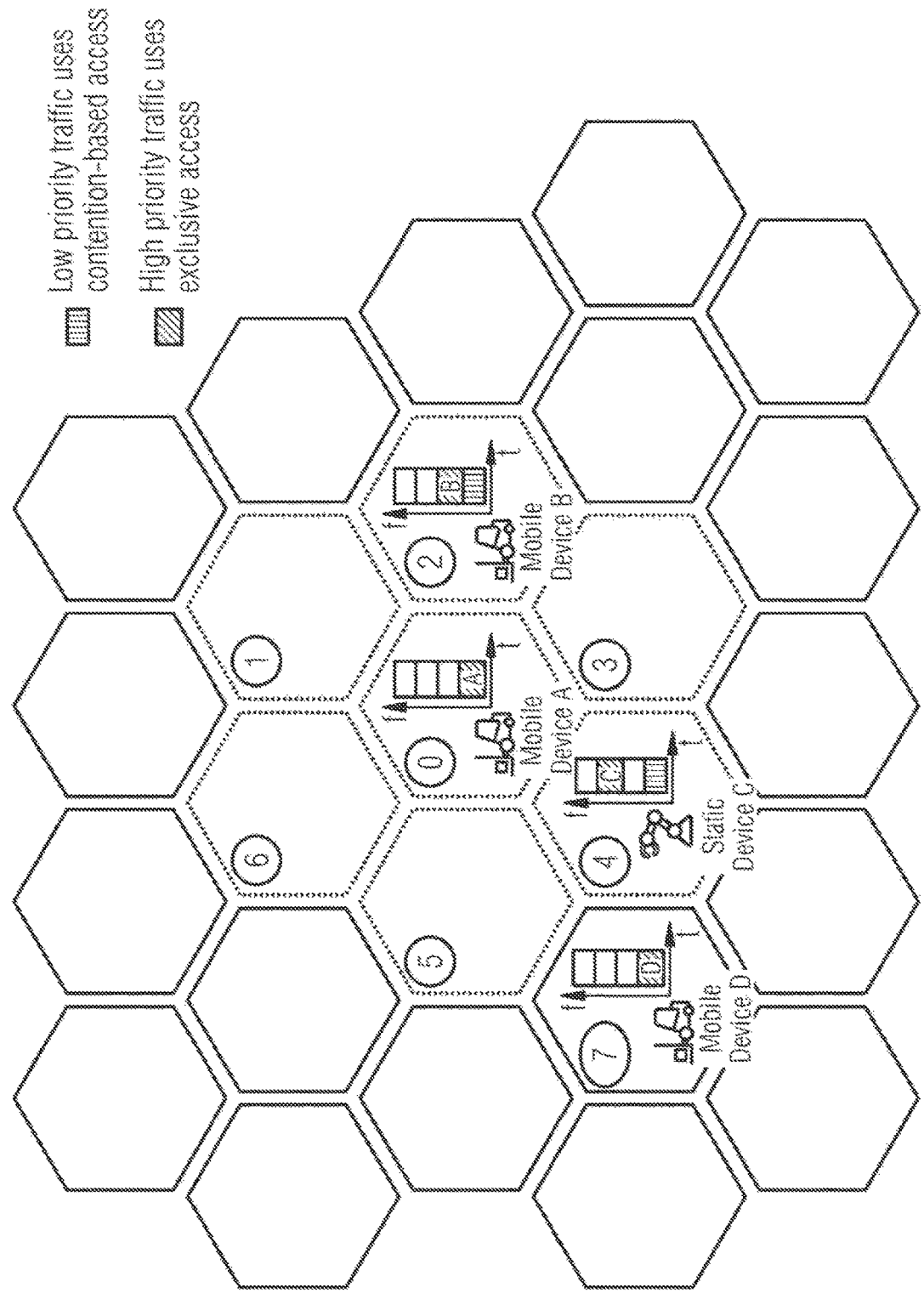
FIG. 3 is a schematic representation of interference avoidance in a multi-cellular architecture for wireless communication in an industrial process.

Regarding the radio resources assigned to high priority traffic, the same resources can be reused in non-neighboring cells. This is highlighted in FIG. 3 where a device A owns a certain radio resource in cell 0 which is not allowed to be assigned by any other LRC in (adjacent) cells 1-6, since it can cause interference and thus affect the reliability of the transmission. The LRCs in cell 1 to 6 are responsible for non-interfering radio resources, for example, in cell 2 the mobile device B and in cell 4 the static device C use assigned resources from different frequency bands. For spectral efficiency reasons, the same radio resource can be assigned again (with appropriate transmit power regulations) next to neighboring cells as indicated by mobile device D residing next to cell 4 and 5 in FIG. 3. If one or more radio devices, are stationary and thus, stay in their cell, the effects of interference are minimized by way of this scheme.

However, mobile (non-stationary) devices can move to another cell (governed by another or the same LRC) which can cause interference and even a total loss of connectivity. Thus, an appropriate handover mechanism is needed.

Figure 4:
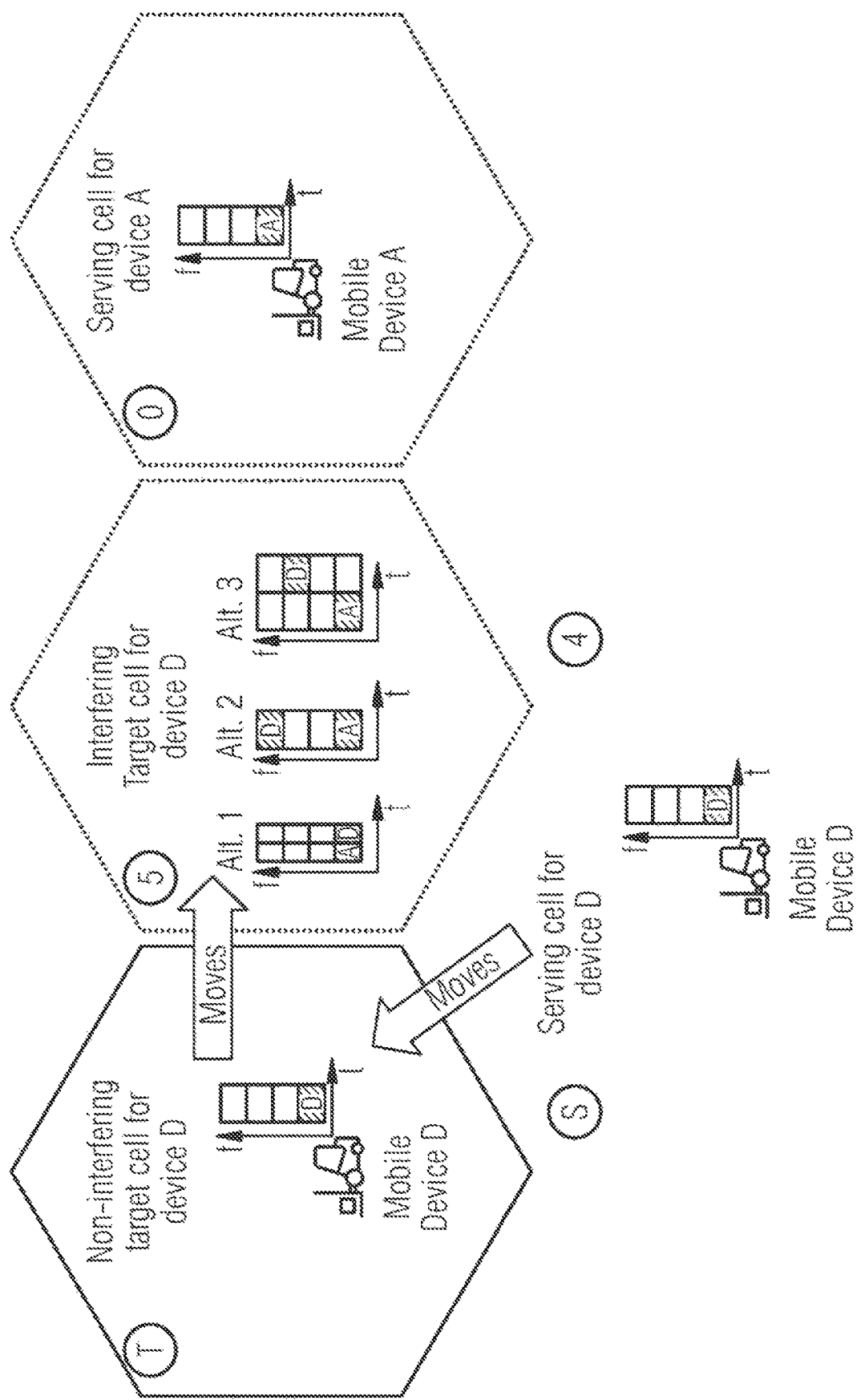
FIG. 4 is a schematic representation of interference mitigation in a multi-cellular architecture for wireless communication in an industrial process.

FIG. 4 shows a mobile device D which first moves from its serving cell S towards the target cell T. The device D may perform continuous measurements, e.g. generate measurement data, and report them to the LRC. The reported measurements may include at least one of: (i) channel measurements based on signal strength (minimum, maximum, and average over a time window) to any LRC and interference measurements on the node as well as using external sensors; and (ii) traffic characteristic based on packet size, inter-arrival time of packets, and/or priority of traffic. If an LRC detects that the mobile device D is below a certain signal strength threshold, it may inform the GRC. Based on different measurements the GRC may be able to estimate the direction of the device. The GRC may inform the source LRC, governing the source cell S, and a target LRC, governing the target cell T, about an upcoming handover and may subsequently initiate a handover procedure. Since the resources in one or more neighboring cells, for example in one or more one adjacent cells, more particularly in all neighboring or all adjacent cells, may not be assigned to any other high priority traffic (or to one or more non-stationary radio devices, as the case may be) and preferably all cells are time synchronized, the mobile device D can use the already assigned resources without interruption and/or any delay on the target LRC T. As a comparison with LTE, a random access channel (RACH) procedure plus a conflict resolution scheme plus signaling messages have to be exchanged before the actual data can be transmitted in case of a handover, which typically requires around 50 ms.

According to the scheme proposed, these three (LTE) procedures are not necessary and thus 50 ms are saved when moving from one cell to another. After the GRC decides about the handover, the target LRC may (immediately) take over the role of serving LRC.

If the mobile device D moves from cell T to (adjacent) cell 5 additional mechanisms are needed since if the mobile device continuous using the assigned radio resource it will interfere with devices in cell 5 and/or cell 0. Therefore, different mitigation strategies may be applied.

In a first embodiment, of a mitigation strategy, denoted as Alt. 1 in FIG. 4, the radio resources are subdivided into time slots in the time domain, and a portion of the slots are assigned in a disjunctive manner between the mobile devices, for example, mobile device A accesses the first half of the slots in cell 0 and the mobile device D uses the latter half in cell 5 (cf. Alt. 1 in FIG. 4). As a comparison with LTE, there is no need for the RACH procedure and the conflict resolution procedure. However, the GRC needs to signal the respective devices (i.e., device A in cell 0 and device D in cell 5) which portion of the resources should be used for their mobile devices. This time needed for this signaling is comparable to the time needed also in LTE. To conclude, the saved time in this case (in comparison to LTE) is the RACH procedure plus the conflict resolution time.

In the second embodiment, of a mitigation strategy, based on the GRCs decision, the LRC assigns a different non-interfering resource in another sub-band (cf. Alt. 2 in FIG. 4). The required time for the handover is comparable as in the first embodiment.

In the third embodiment, of a mitigation strategy, if the time constraint of the mobile device allows, the resource can be scheduled later in time and additionally also in frequency (cf. Alt. 3 in FIG. 4), The time for the handover is comparable to the previous embodiments.

Figure 5:
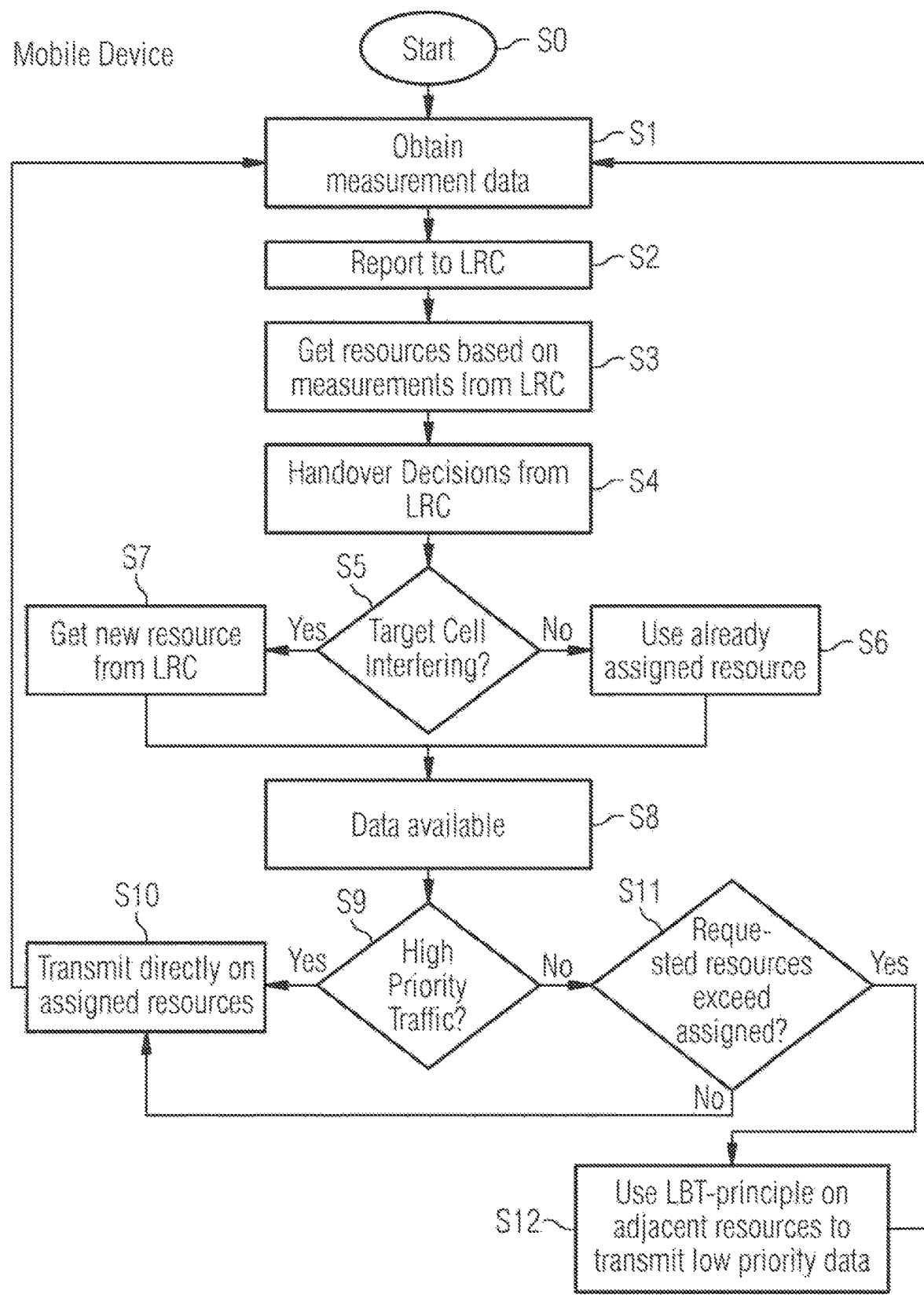
FIG. 5 is a schematic representation of a flow chart illustrating an exemplary embodiment in a radio device.
Figure 6:
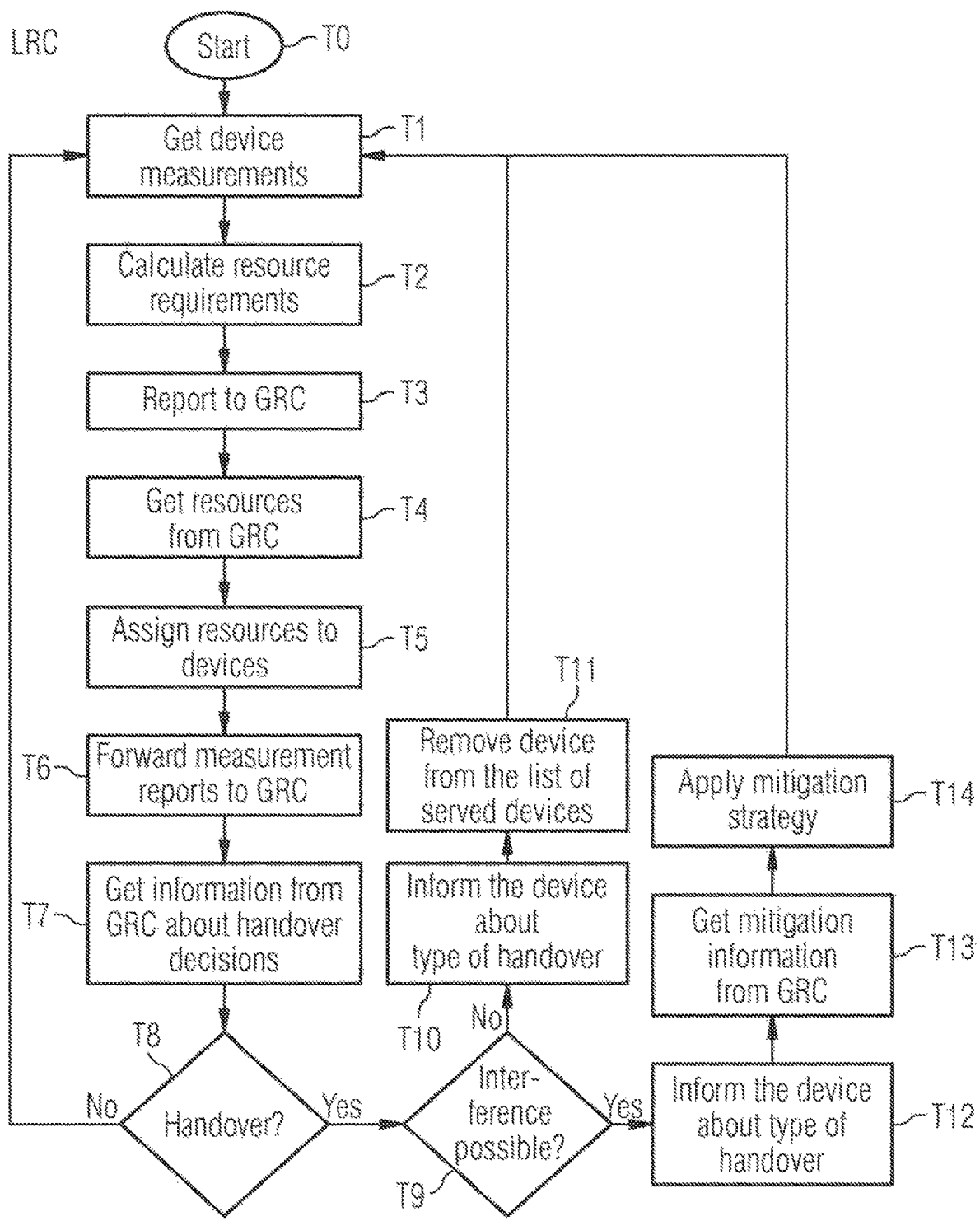
FIG. 6 is a schematic representation of a flow chart illustrating an exemplary embodiment in a local radio controller.
Figure 7:
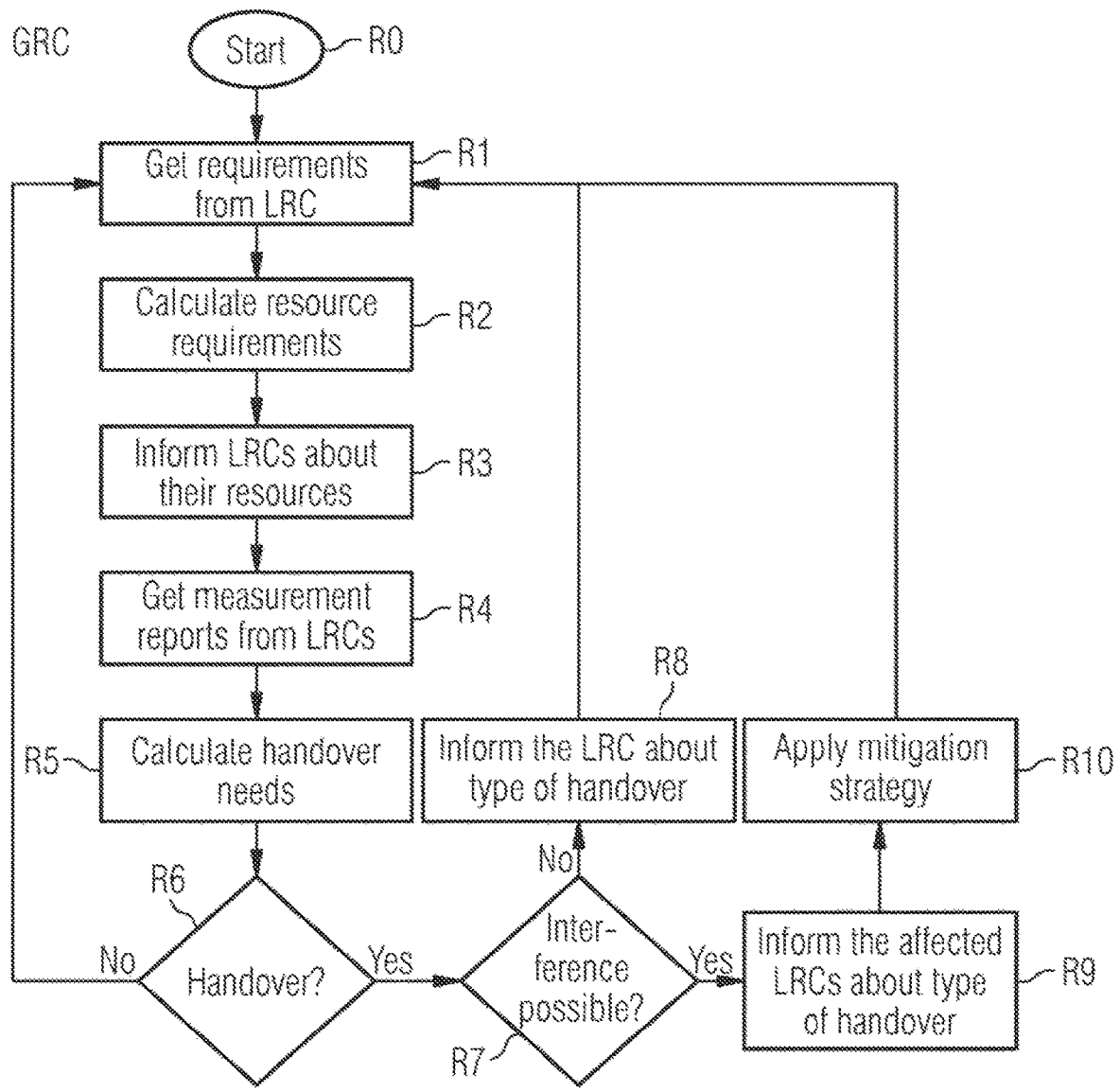
FIG. 7 is a schematic representation of a flow chart illustrating an exemplary embodiment in a global radio controller.

FIGS. 5, 6 and 7 show by way of a flowchart an exemplary sequence of operations performed at the non-stationary device, e.g. a terminal or an MTC device, at the LRC, e.g. a small cell base-station or an access point and at the GRC, e.g. a base-station, a micro- or a macro base-station, respectively. A mobile device is also denoted as a non-stationary device throughout the description.

Now turning to FIG. 5, after setting-up a radio device in a step S0 the radio device may perform one or more measurements in order to determine signal quality over one or more radio communication channels, e.g. as described in the above. Thus in a step S1 the radio device may obtain measurement data reflecting measurement results. In a step S2 the device may report this data to an LRC (preferably the LRC the device is assigned to in the first place). In a step S3 the device may obtain from the LRC radio resources based on those measurements. However, the decision of resource assignment may be based on other criteria than the measurement data reported or the measurement data may be taken into account in addition to the measurement data reported. As described in the above for a non-stationary device a handover decision may be taken by the LRC in a step S4. This decision may be transmitted to the (non-stationary) radio device. In a step S5 it is determined whether the target cell is interfering. For example, interference may occur when the resources assigned to the device in step S3 are also assigned to a device in a neighboring cell, e.g. an adjacent cell. Thus dependent on the outcome of step S5 either step S6 or step S7 may be performed. Thus in case the target cell is not interfering (on the resources assigned to the mobile device in step S3) the resources already assigned to the mobile device may be continued to be used. In the alternative case new radio resources may be assigned to the mobile device in a step S7. Subsequently after performing steps S6 or S7 data may become available which has to be transmitted to the LRC/GRC or to another stationary or non-stationary radio device. In a step S8 data may then become available. Hence in a step S9 it is determined whether this data is of high priority. Subsequently the data may be transmitted in a step S10 on the (same) radio resources assigned to the mobile device, e.g. in step S3 or in step S7. If the data is of no high priority traffic it is determined in a step S11 whether the resources required for data transmission exceed the ones assigned to the mobile device. Additionally or alternatively, step S11 may comprise determining whether the data size (of the data available) exceeds the resources granted. This is because the data (available) may lead to a request (for resources) which (request) exceeds the granted resources.

If this is not the case the data may nonetheless be transmitted in a step S11 via the resources already assigned. If the data transmission of lower priority traffic should exceed the resources available, this lower priority data may be transmitted in a step S12 e.g. by way of a Listen-Before-Talk principle (LBT) on adjacent resources, e.g. in an unlicensed frequency band. After performing step S10 or S12 respectively, the mobile device may again perform step S1 and obtain measurement data, e.g. for the resources assigned.

Now turning to FIG. 6, a method in a LRC is described. After setting up the LRC in a step T0, the LRC may obtain in a step T1 measurements, e.g. in the form of measurement data or a corresponding indication, from one or more radio device within its coverage are, i.e. cell. The LRC may additionally or alternatively obtain traffic requirements and/or other information characterizing the capabilities and requirements of the one or more radio devices. The LRC may calculate in a step T2 the resource requirements, e.g. based on the measurements obtained in step T1, for the one or more radio device. In a step T3 these requirements may be reported to a GRC. In a step T4, the LRC may obtain radio resources which it is allowed to assign to the radio devices with its cell. In a step T5, the radio resources allowed may be assigned by the LRC to the one or more radio devices on its cell. In a step T6, the LRC may (again) obtain measurement reports from the one or more radio devices for the respective resources assigned and forward them to the GRC. This one or more measurement reports may be used by the GRC to determine whether a handover from a first LRC to another LRC is necessary. In a step T7, the LRC may be informed about handover decisions by the GRC, that is to say the criteria under which a handover is to be performed by the LRC.

Thus in a step T8 it is determined whether a handover should be performed, e.g. based on the handover criteria obtained from the GRC. If no handover is to be performed the LRC may continue with step T1 again. However, if a handover should be performed based on the outcome of step T8 it may be determined in a step T9 whether interference is possible on the resources currently assigned. If no interference is likely or possible for those resources the radio device using those resources may be informed about the handover and/or the type of handover to be performed. Subsequently the device may be removed from the list of devices served by the LRC. However, if it is determined in step T9 that interference is possible or likely on the resources used by the one or more radio devices respectively, the device(s) may be informed about the type of handover in a step T12. In a step T13 the LRC may then obtain mitigation information from the GRC or make use of such information already received in order to mitigate the interference expected. In a step T14 a mitigation strategy may then be applied by the LRC. The LRC may then proceed with step T1 and obtain one or more measurements from the one or more radio devices.

Now turning to FIG. 7, after setting-up a GRC in a step R0 the GRC may obtain certain requirements, e.g. wrt to traffic and data needs of the LRCs and or the respective radio devices, from one or more LRCs in a step R1. The GRC may then calculate resource requirements, e.g. based on the requirements received from the one or more LRCs, in a step R2. In a step R3, the GRC may inform the one or more LRCs about the resources assigned to the LRC for further distribution (to the one or more radio devices) by the respective LRC. In a step R4 the GRC may then obtain one or more measurement reports from the one or more LRCs for the resources allowed. In a step R5 the GRC may calculate handover needs or requirements for handover between one or more, preferably adjacent, LRCs. In a step R6 the GRC may determine whether a handover should be performed. In case no handover is to be performed, the GRC may continue with step R1 and obtain requirements from the one or more LRCs. In case it is determined in step R6 that a handover is to be performed the GRC may determine in a step R7 whether interference is possible or likely for the radio device. If interference is possible or the likelihood thereof is above certain threshold the LRCs involved in the handover may be informed in a step R9. In a subsequent step R10 a mitigation strategy may be applied by the GRC, e.g. by reassigning resources to the radio device directly or to the LRCs involved, and subsequently the GRC may continue e.g. with step R1. If it is determined in step R7 that interference is not likely, e.g. interference is expected to be below a certain threshold, the GRC may continue with step R8 and inform the one or more LRCs involved about the type of handover. The GRC may subsequently continue with step R1 again.

Figure 8:
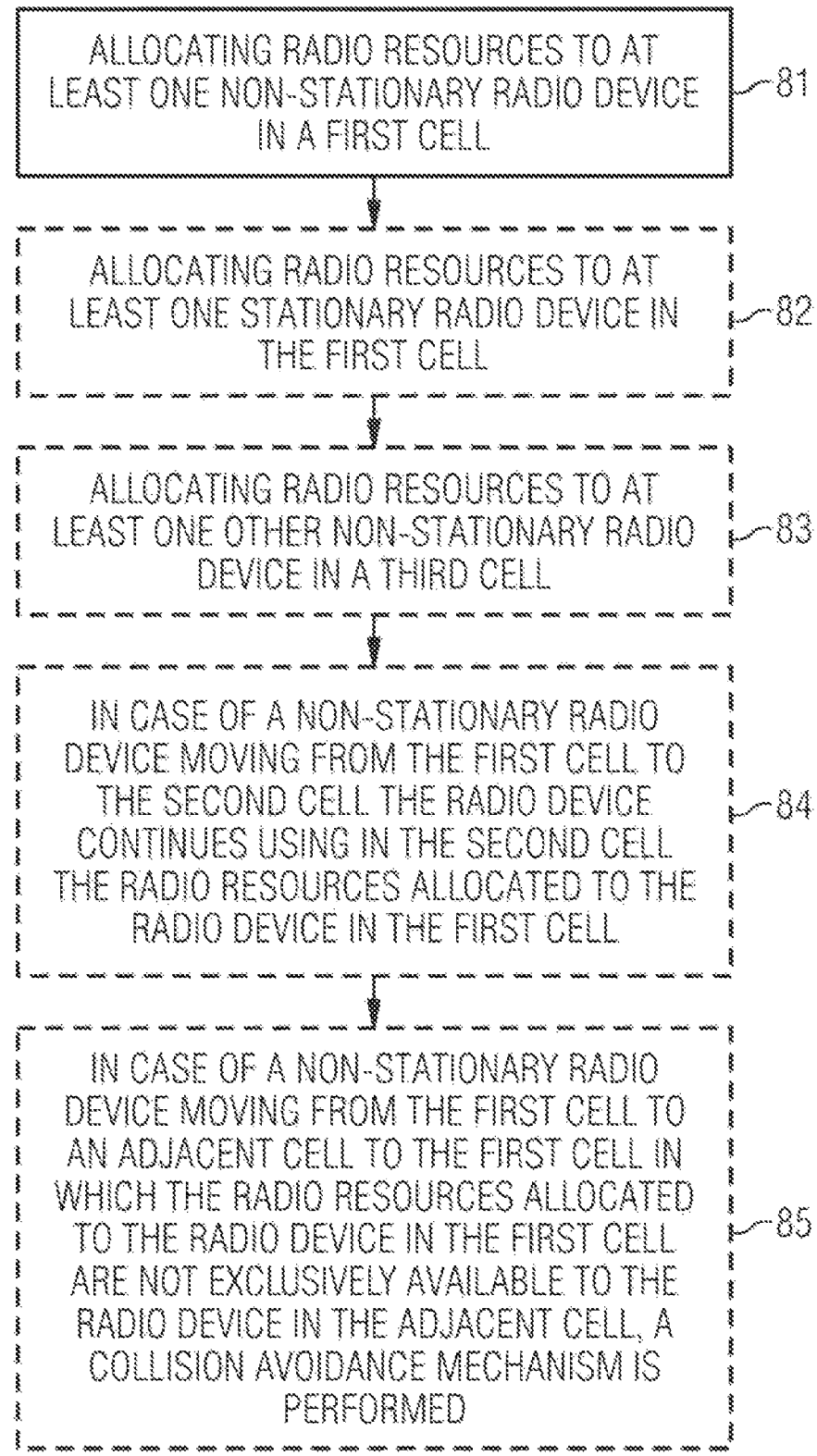
FIG. 8 is a schematic representation of a flow chart illustrating another exemplary embodiment of resource allocation for a non-stationary radio device.

FIG. 8 shows another flow chart of an exemplary embodiment of a radio control node. The method steps shown may be all or in part be performed by a LRC. In a first step 81 radio resources may be allocated to at least one non-stationary radio device in a first cell. In a step 82 radio resources may be allocated to at least one stationary radio device in the first cell. In a step 93 radio resources may be allocated to at least one other non-stationary radio device in a third cell. Thus different radio device may perform radio communication on the same or different resources. In a step 84 and in case of the non-stationary radio device moving from the first cell to the second cell the radio device may continue using in the second cell the radio resources allocated to the radio device in the first cell. For this purpose, coordination of radio resources may take place between the LRCs involved and/or the LRCs involved and the GRC. For example the respective frequencies may be cleared from other devices employing the same or partly the same frequency and/or time resources. In a step 85 and in case of a non-stationary radio device moving from the first cell to an adjacent cell to the first cell in which the radio resources allocated to the radio device in the first cell are not exclusively available to the radio device in the adjacent cell, a collision avoidance mechanism is performed. As explained in the above, radio resource reassignment in the frequency and/or time domain may be applied, e.g. according to FIG. 4.

Figure 9:
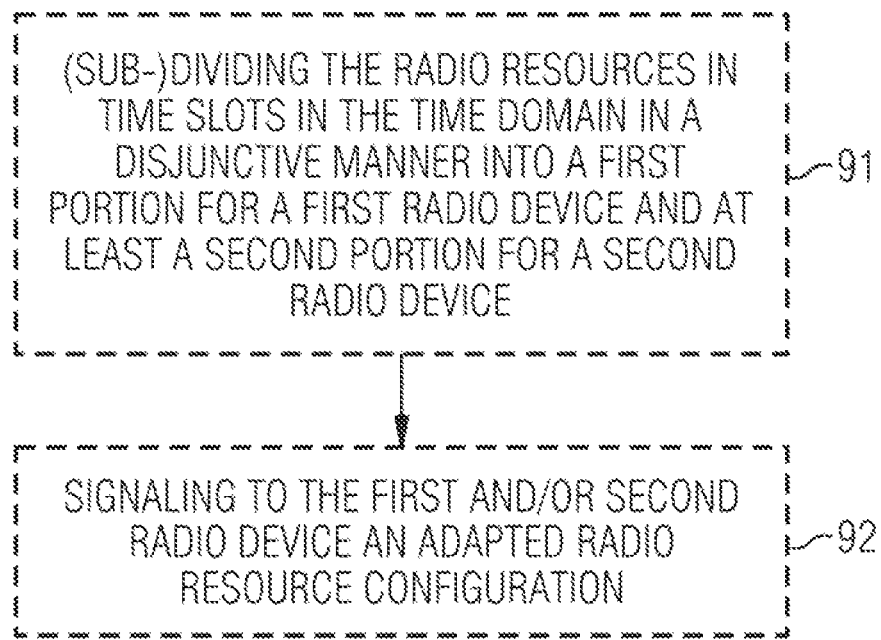
FIG. 9 is a schematic representation of a flow chart illustrating another exemplary embodiment of interference mitigation.

FIG. 9 is a schematic representation of a flow chart illustrating another exemplary embodiment of interference mitigation which may be performed by a radio control node such as a LRC and/or a GRC. Interference mitigation may comprise in a first step 91 (sub-)dividing the radio resources in time slots in the time domain in a disjunctive manner into a first portion for a first radio device and at least a second portion for a second radio device, as. e.g. shown in alternative Alt1. And Alt. 3 in FIG. 4. In a second step 92 interference mitigation may comprise signaling to the first and/or second radio device an adapted radio resource configuration.

Figure 10:
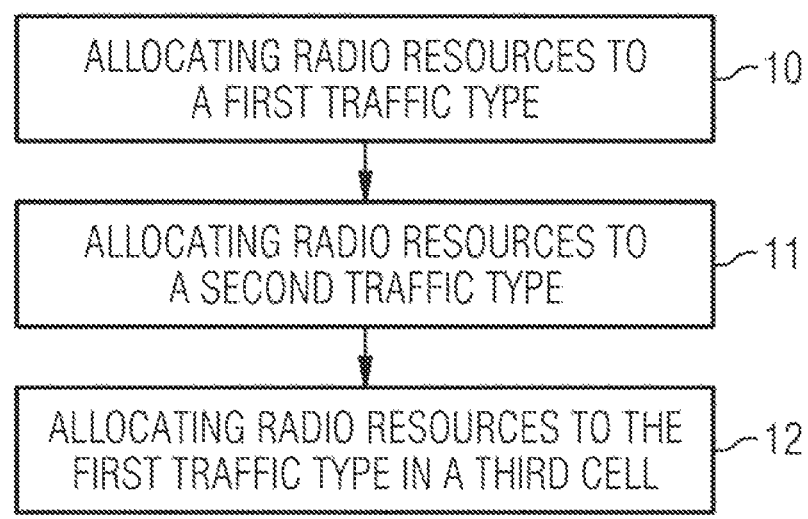
FIG. 10 is a schematic representation of a flow chart illustrating still another exemplary embodiment of resource allocation for different traffic types.

FIG. 10 is a schematic representation of a flow chart illustrating still another exemplary embodiment of resource allocation for different traffic types which may be performed by a radio control node such as a GRC and or an LRC. In a step 10 radio resources may be allocated to a first traffic type, e.g. in a first cell. This may be determined based on the content of the data to be transmitted. For example, at least two traffic types for data to be transmitted may exist and these traffic types may be assigned to the respective data or data package(s) to be transmitted. In a step 11 radio resources may be allocated to a second traffic type, e.g. in the first cell as well. Thus, data may be transmitted on different radio resources dependent of the traffic type assigned to the data or data package(s). In a step 12 radio resources may be allocated to the first traffic type in a third cell. Preferably said third cell is a cell adjacent to the first cell. This allows for usage of resources for the first traffic type without interruption when moving from the first cell to the third cell.

Figure 11:
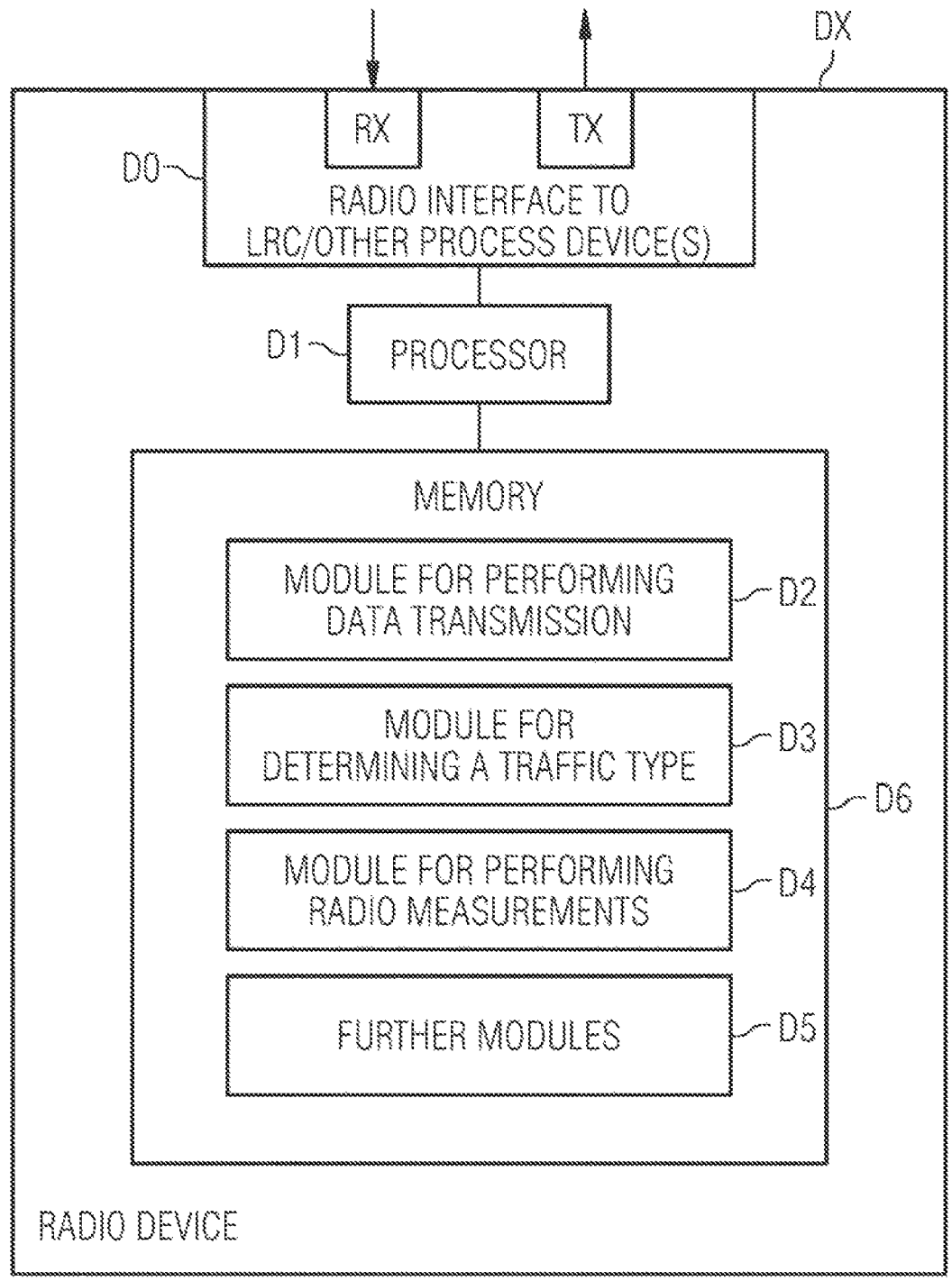
FIG. 11 is a schematic representation of a flow chart illustrating another exemplary embodiment of a radio device.

Now referring to FIG. 11, exemplary structures for implementing the above-described concepts in the radio device, preferably a non-stationary, are schematically illustrated. As described in the above said radio device is either a stationary or non-stationary radio device. Said radio device is preferably is a process device performing an action within the industrial application or is attached/attachable to such a process device, cf. the process devices as described inter alia in FIGS. 1 and 2.

In the illustrated structure, the radio device DX includes a radio interface D0 for performing data transmission to or from the radio device DX to an LRC and/or other radio devices, e.g. via a first (radio) link. It is to be understood that for implementing transmitter (TX) functionalities the radio interface D0 includes one or more transmitters, and that for implementing receiver functionalities (RX) functionalities the radio interface D0 may include one or more receivers.

Further, the radio device DX includes a processor D1 coupled to the radio interface D0 and a memory D6 coupled to the processor D1. The memory may include a ROM, e.g., a flash ROM, a RAM, e.g., a DRAM or SRAM, a mass storage, e.g., a hard disk or solid state disk, or the like. The memory D6 includes suitably configured program code to be executed by the processor so as to implement the above-described functionalities of the radio device. More specifically, the memory D6 may include a module D2 for performing data transmission D6. Further, the memory may also include a module D3 for determining a traffic type. Further, the memory may include a module D4 for performing radio measurements, e.g. on the resources assigned to the radio device DX. transmitting an indication. The memory may also comprise further modules D5 to perform the steps as described with respect to the previous embodiments.

It is to be understood that the structure as illustrated in FIG. 11 is merely schematic and that the radio device DX may actually include further components which, for the sake of clarity, have not been illustrated, e.g., further interfaces or additional processors. Also, it is to be understood that the memory D6 may include further types of program code modules, which have not been illustrated. For example, the memory D6 may include program code modules for implementing typical functionalities of a radio device or program code of one or more applications to be executed by the processor. According to some embodiments, also a computer program product may be provided for implementing concepts according to embodiments disclosed before, e.g., a computer-readable medium storing the program code and/or other data to be stored in the memory.

Figure 12:
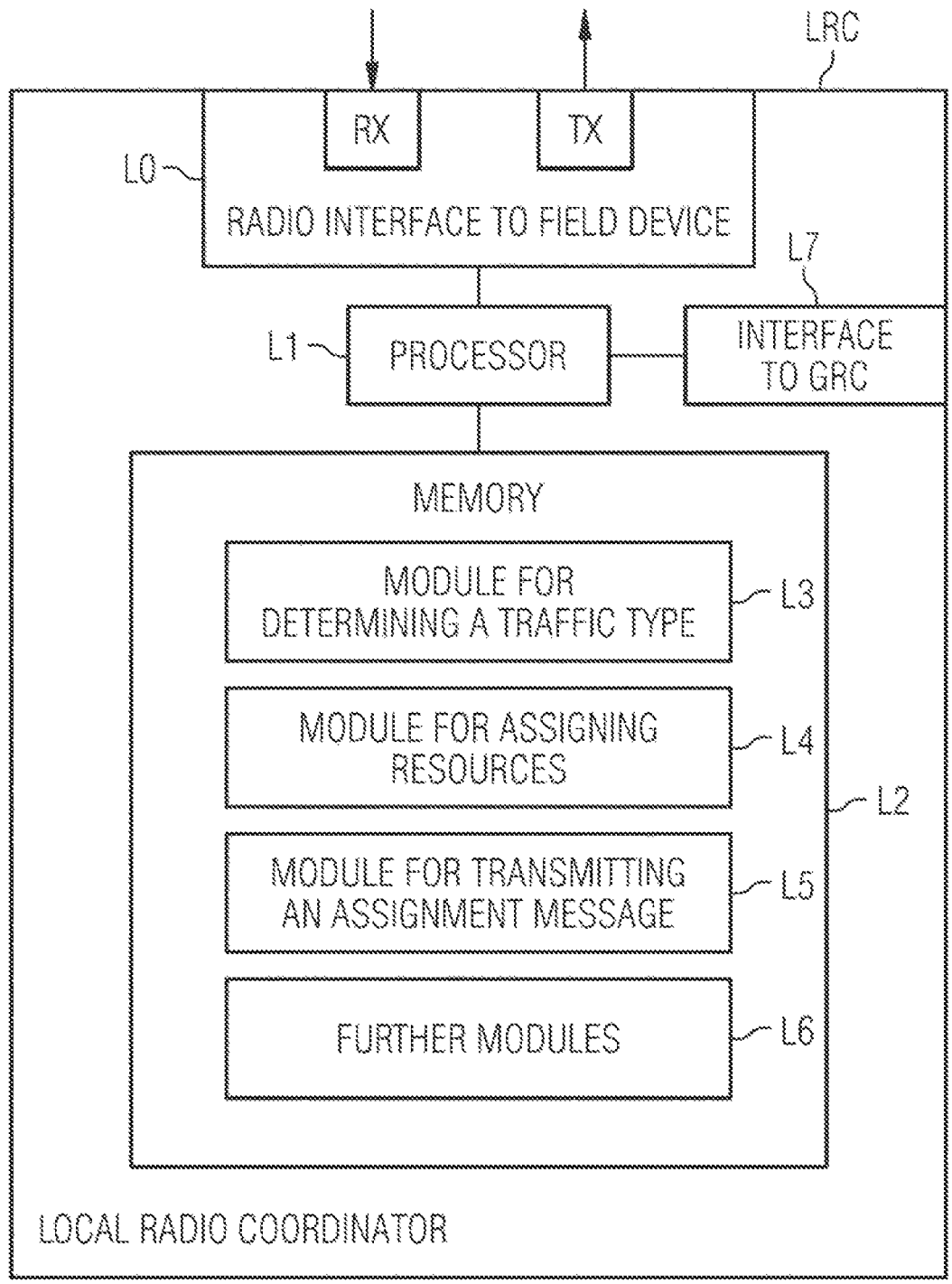
FIG. 12 is a schematic representation of a flow chart illustrating another exemplary embodiment of a local radio coordinator.

Now referring to FIG. 12 exemplary structures for implementing the above-described concepts in a radio control node, such as a Local Radio Coordinator LRC, is shown. In the illustrated structure, the LRC includes a radio interface L0 for performing data transmission to or from the radio device DX. It is to be understood that for implementing transmitter (TX) functionalities the radio interface includes one or more transmitters, and that for implementing receiver functionalities (RX) functionalities the radio interface may include one or more receivers. In the above-mentioned scenario, the radio interface may correspond to the Uu interface of the Evolved Universal Terrestrial Radio Access Network (E-UTRAN) or according to IEEE 802.11 a/h, b/g, n, ac and/or make use of radio frequencies according to IEEE 802.11 a/h, b/g, n, ac and/or data rates according to IEEE 802.11 a/h, b/g, n, ac. Further, the LRC may comprise a further interface L7 for performing data transmission to and from a GRC, such as the above described GRC. The interface L7 may enable wireless and/or wired transmission.

It should be understood that the radio interface to the radio device DX and the interface to the GRC may be combined in one interface only.

Further, the GRC includes a processor L1 coupled to the radio interface L0 and a memory L2 coupled to the processor L1. The memory L2 may include a ROM, e.g., a flash ROM, a RAM, e.g., a DRAM or SRAM, a mass storage, e.g., a hard disk or solid state disk, or the like. The memory L2 includes suitably configured program code to be executed by the processor so as to implement the above-described functionalities of the LRC. More specifically, the memory may include a module for accomplishing provision of: determining a traffic type L3, assigning radio resources L4 (to the one or more radio devices) and/or transmitting assignment message L5 (assigning radio resources to the one or more radio devices). Additionally, the memory may include further modules L6 for accomplishing the functions as described in the above in connection with an LRC.

It is to be understood that the structure as illustrated in FIG. 12 is merely schematic and that the LRC may actually include further components which, for the sake of clarity, have not been illustrated, e.g., further interfaces or additional processors. Also, it is to be understood that the memory of the second node may include further types of program code modules, which have not been illustrated. For example, the memory may include program code modules for implementing typical functionalities of an access node, e.g. LTE and/or WLAN, or program code of one or more applications to be executed by the processor. According to some embodiments, also a computer program product may be provided for implementing concepts according to embodiments of the embodiments disclosed herein, e.g., a computer-readable medium storing the program code and/or other data to be stored in the memory.

Figure 13:
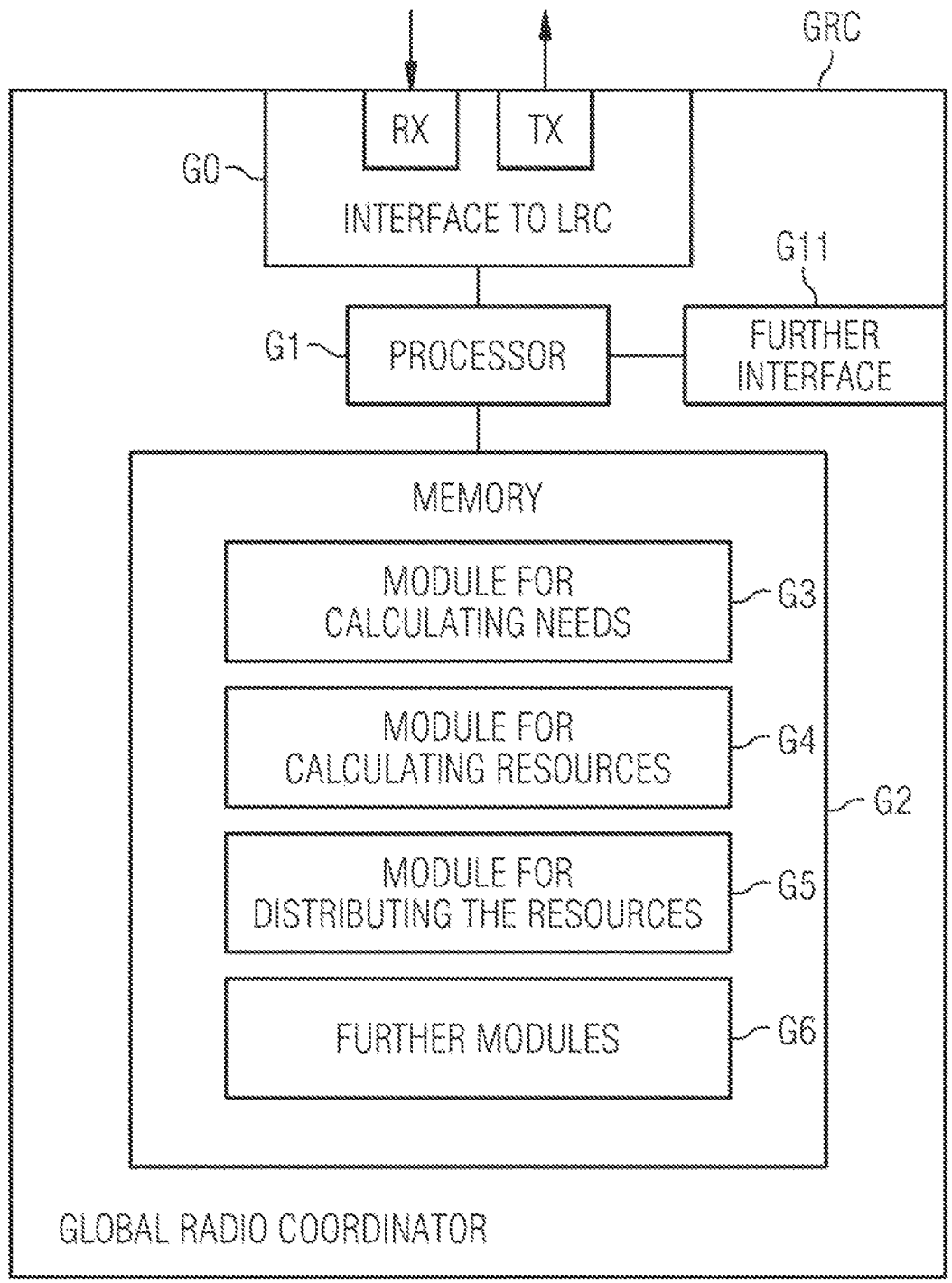
FIG. 13 is a schematic representation of a flow chart illustrating another exemplary embodiment of a global radio coordinator.

Now referring to FIG. 13, exemplary structures for implementing the above-described concepts in a radio control node, such as a Global Radio Coordinator GRC, are shown. In the illustrated structure, the GRC includes an interface G0 for performing data transmission to or from the one or more LRCs. However, it should be understood that other interfaces G11 for communication with the one or more LRCs or one or more other coordination units may be present. It is also to be understood that for implementing transmitter (TX) functionalities the radio interface G0 includes one or more transmitters, and that for implementing receiver functionalities (RX) functionalities the radio interface G0 may include one or more receivers.

Further, the GRC includes a processor G1 coupled to the radio interface G0 and a memory G2 coupled to the processor G1. The memory may include a ROM, e.g., a flash ROM, a RAM, e.g., a DRAM or SRAM, a mass storage, e.g., a hard disk or solid state disk, or the like. The memory G2 includes suitably configured program code to be executed by the processor G1 so as to implement one or more of the above-described functionalities of the GRC. More specifically, the memory G2 may include a module for accomplishing the provision of: calculating the needs G3, e.g. traffic needs (for example packet sizes, inter arrival time of packets, priority, realtime requirements, etc.), in particular based on an indication received from the one or more LRCs and/or the one or more radio devices. The memory G2 may include a module G4 for accomplishing provision of: calculating resources (available for the respective LRCs) e.g. based on the needs/requirements identified. The memory G2 may include a module G5 for accomplishing provision of: distributing the resources (calculated before) e.g. by way or respective messages or indications. Additionally, the memory may include further modules G6 for accomplishing the functions as described in the above in connection with an GRC.

It is to be understood that the structure as illustrated in FIG. 13 is merely schematic and that the GRC may actually include further components which, for the sake of clarity, have not been illustrated, e.g., further interfaces or additional processors. Also, it is to be understood that the memory of the GRC may include further types of program code modules, which have not been illustrated. According to some embodiments, also a computer program product may be provided for implementing concepts according to embodiments disclosed herein, e.g., a computer-readable medium storing the program code and/or other data to be stored in the memory.

Modifications and other embodiments of the disclosed embodiments(s) will come to mind to one skilled in the art having the benefit of the teachings presented in the foregoing descriptions and the associated drawings. Therefore, it is to be understood that the described embodiments(s) is/are not to be limited to the specific embodiments disclosed and that modifications and other embodiments are intended to be included within the scope of this disclosure. Although specific terms may be employed herein, they are used in a generic and descriptive sense only and not for purposes of limitation. Hence, methods and devices for allocating radio resources considering e.g. traffic priority in mobile scenarios for wireless industrial automation applications so that handover times remain very low and the latency critical QoS requirements are satisfied are proposed.

The invention claimed is:

1. A method implemented in a communication network for an industrial application of allocating radio resources for one or more radio devices, the method comprising:

allocating, by a global resource coordinator in the communication network, first radio resources to a first local resource coordinator in a first cell of the communication network for use by non-stationary radio devices in the first cell;

making the first radio resources exclusively available in a second cell of the communication network adjacent to the first cell for the non-stationary radio devices in the first cell; and in response to a non-stationary radio device in the first cell moving to an adjacent cell where the first radio resources are not exclusively available for the non-stationary radio devices, dividing radio resources allocated to the non-stationary radio device, comprised in the first radio resources, in time slots in the time domain in a disjunctive manner into a first portion for the non-stationary radio device to use in the adjacent cell and at least a second portion for another non-stationary radio device in a third cell non-neighboring to the first cell, wherein the disjunctive manner indicates that the first portion includes a first half of time slots assigned to the non-stationary radio device and the second portion includes a second half of time slots assigned to the other non-stationary radio device in the third cell.

2. The method of claim 1, further comprising:

allocating, by the global resource coordinator in the communication network, second radio resources to the first local resource coordinator in the first cell of the communication network for use by stationary radio devices in the first cell; and making the second radio resources available in the second cell of the communication network for stationary radio devices in the second cell.

3. The method of claim 2, further comprising:

allocating, by the global resource coordinator in the communication network, the first radio resources to a third local resource coordinator in the third cell of the communication network for use by non-stationary radio devices in the third cell.

4. The method of claim 2, further comprising:

allocating, by the global resource coordinator in the communication network, third radio resources to a second local resource coordinator in the second cell of the communication network for use by non-stationary radio devices in the third cell of the communication network, wherein the third radio resources do not overlap with the first radio resources.

5. The method of claim 1, wherein the method further comprises signaling an adapted radio resource configuration to the non-stationary radio device and/or the other non-stationary radio device.

6. A radio control node for allocating radio resources for one or more radio devices in a communication network for an industrial application, the radio control node comprising:

processing circuitry; and memory containing instructions executable by the processing circuitry, whereby the radio control node is operative to:
- allocate first radio resources to a first local resource coordinator in a first cell of the communication network for use by non-stationary radio devices in the first cell;
- make the first radio resources exclusively available in a second cell of the communication network adjacent to the first cell for the non-stationary radio devices in the first cell; and
- in response to a non-stationary radio device in the first cell moving to an adjacent cell where the first radio resources are not exclusively available for the non-stationary radio devices, divide radio resources allocated to the non-stationary radio device, comprised in the first radio resources, in time slots in the time domain in a disjunctive manner into a first portion for the non-stationary radio device to use in the adjacent cell and at least a second portion for another non-stationary radio device in a third cell non-neighboring to the first cell,
- wherein the disjunctive manner indicates that the first portion includes a first half of time slots assigned to the non-stationary radio device and the second portion includes a second half of time slots assigned to the other non-stationary radio device in the third cell.

7. The radio control node of claim 6, wherein the radio control node is further operative to:
- allocate second radio resources to the first local resource coordinator in the first cell of the communication network for use by stationary radio devices in the first cell; and
- make the second radio resources available in the second cell of the communication network for stationary radio devices in the second cell.

8. The radio control node of claim 7, wherein the radio control node is further operative to:
- allocate the first radio resources to a third local resource coordinator in the third cell of the communication network for use by non-stationary radio devices in the third cell.

9. The radio control node of claim 7, wherein the radio control node is further operative to:
- allocate third radio resources to a second local resource coordinator in the second cell of the communication network for use by non-stationary radio devices in the third cell of the communication network, and
- wherein the third radio resources do not overlap with the first radio resources.

10. A non-transitory computer readable recording medium storing a computer program product for allocating radio resources for one or more radio devices in an industrial application (IA), the computer program product comprising software instructions which, when run on processing circuitry of a computing device, cause the computing device to:
- allocate first radio resources to a first local resource coordinator in a first cell of the IA for use by non-stationary radio devices in the first cell;
- make the first radio resources exclusively available in a second cell of the IA adjacent to the first cell for the non-stationary radio devices in the first cell; and
- in response to a non-stationary radio device in the first cell moving to an adjacent cell where the first radio resources are not exclusively available for the non-stationary radio devices, divide radio resources allocated to the non-stationary radio device, comprised in the first radio resources, in time slots in the time domain in a disjunctive manner into a first portion for the non-stationary radio device to use in the adjacent cell and at least a second portion for another non-stationary radio device in a third cell non-neighboring to the first cell,
- wherein the disjunctive manner indicates that the first portion includes a first half of time slots assigned to the non-stationary radio device and the second portion includes a second half of time slots assigned to the other non-stationary radio device in the third cell.

11. A method implemented in a communication network for an industrial application of allocating radio resources for one or more radio devices, the method comprising:
- allocating, by a global resource coordinator in the communication network, radio resources to two or more local resource coordinators in respective cells of the communication network for use by radio devices served by the two or more local resource coordinators;
- allocating, by a first local resource coordinator in a first cell of the communication network, first radio resources selected from the allocated radio resources to at least one non-stationary radio device in the first cell; and
- preventing allocation of the first radio resources by a second local resource coordinator in a second cell of the communication network, wherein the second cell is adjacent to the first cell so that the first radio resources are exclusively available for the at least one non-stationary radio device in the first cell.

12. The method of claim 11, further comprising:
- allocating, by the first local resource coordinator in the first cell, second radio resources selected from the allocated radio resources to at least one stationary radio device in the first cell; and
- allocating, by the second local resource coordinator in the second cell, the second radio resources to at least one stationary radio device in the second cell.

13. The method of claim 12, further comprising:
- allocating, by a third local resource coordinator in a third cell of the communication network, the first radio resources for use by at least one non-stationary radio device in the third cell,
- wherein the third cell is a non-neighboring cell to the first cell.

14. The method of claim 12, further comprising:
- allocating, by the second local resource coordinator in the second cell of the communication network, third radio resources selected from the allocated radio resources, for use by at least one non-stationary radio device in a third cell of the communication network,
- wherein the third radio resources do not overlap with the first radio resources.

15. A communication network for an industrial application, the communication network comprising:
- a global resource coordinator configured to allocate radio resources to two or more local resource coordinators in respective cells of the communication network for use by radio devices served by the two or more local resource coordinators;
- a first local resource coordinator in a first cell of the communication network, the first local resource coordinator being configured by the global resource coordinator to allocate first radio resources selected from the allocated radio resources to at least one non-stationary radio device in the first cell; and a second local resource coordinator in a second cell of the communication network adjacent to the first cell, wherein the second local resource coordinator is configured by the global resource coordinator so that allocation of the first radio resources by the second local resource coordinator in the second cell is prevented so that the first radio resources are exclusively available for the at least one non-stationary radio device in the first cell.

16. The communication network of claim 15, wherein the first and second local resource coordinators are configured by the global resource coordinator to allocate second radio resources selected from the allocated radio resources to stationary radio devices in the first and second cells, respectively.

17. The communication network of claim 16, further comprising:

a third local resource coordinator in a third cell of the communication network configured by the global resource coordinator to allocate the first radio resources to non-stationary radio devices in the third cell, wherein the third cell is a non-neighboring cell to the first cell.

18. The communication network of claim 16, wherein:

the second local resource coordinator is further configured to allocate third radio resources selected from the allocated radio resources, for use by non-stationary radio devices in a third cell of the communication network; and the third radio resources do not overlap with the first radio resources.

* * * * *